United States Patent Office 2,935,794
Patented May 10, 1960

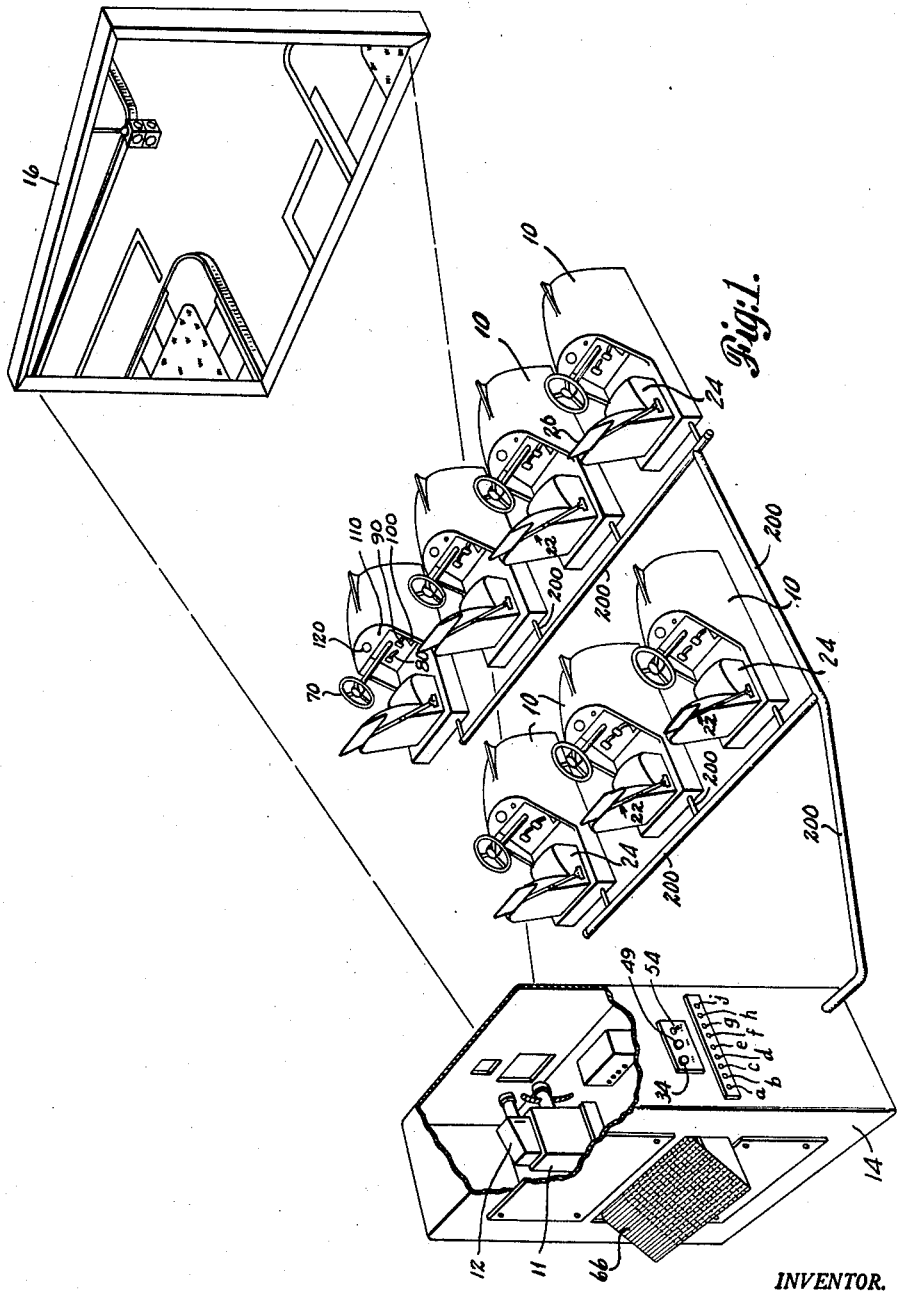

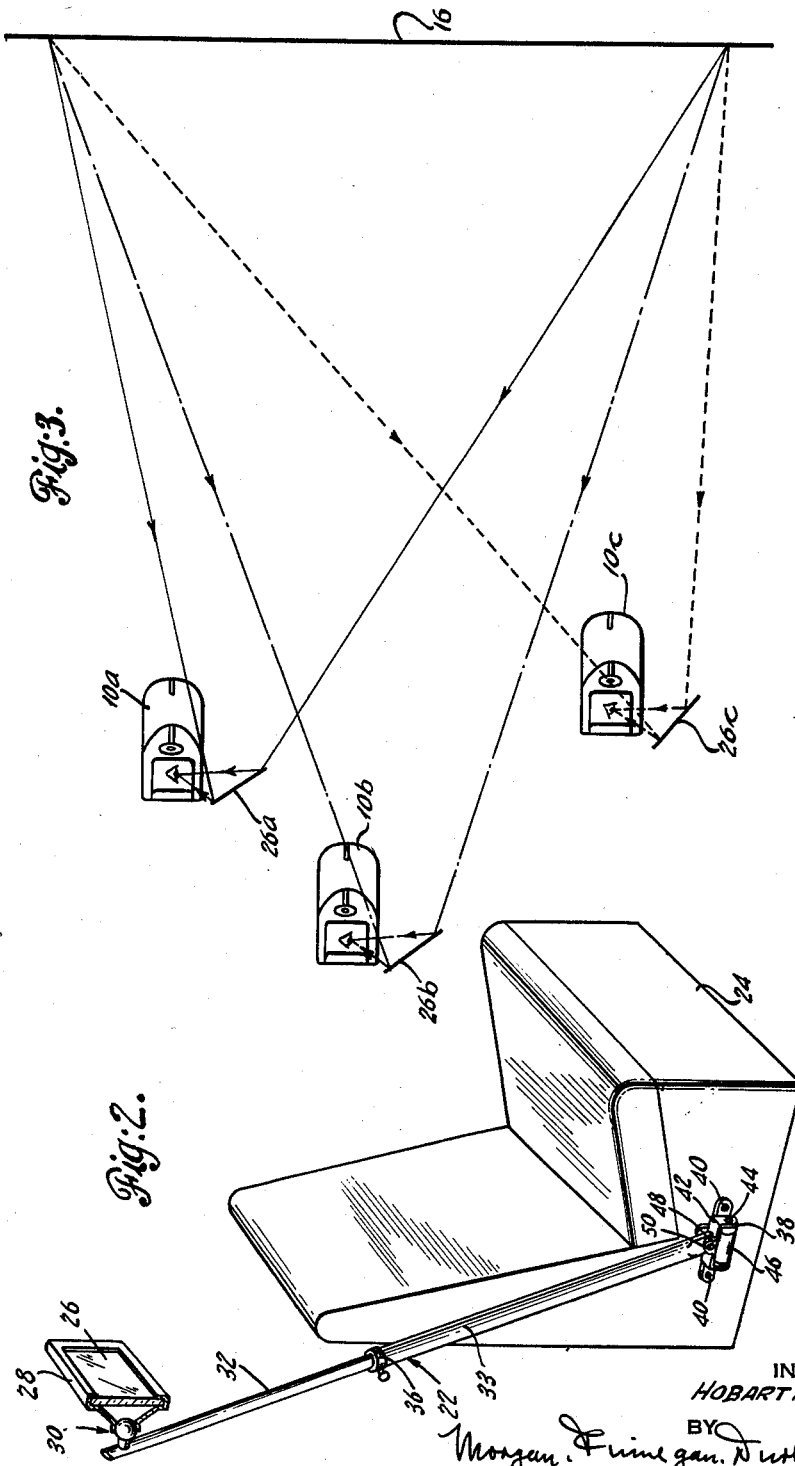

2,935,794

AUTOMOBILE DRIVER TRAINING AND TESTING APPARATUS

Hobart N. Durham, Manhasset, N.Y., assignor to Hobart N. Durham, as trustee

Application October 9, 1953, Serial No. 385,169

3 Claims. (Cl. 35—11)

This invention relates to automatic mechanisms for instructing, training and testing drivers and pilots of automatic equipment such as automobiles and the like and more specifically concerns apparatus to facilitate such instruction and testing in backing procedures encountered in the normal operation of such equipment.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

Of the drawings:

Figure 1 is a perspective view of an automatic driver testing mechanism embodying the invention;

Figure 2 is a side elevation in partial section of a mirror and support therefor as illustrated in Figure 1; and Figure 3 is a plan view of the invention in diagrammatic form to illustrate the operation thereof.

The invention, as indicated above, concerns automatic testing equipment for drivers of automobiles and other vehicles wherein the driver or pilot is seated in apparatus having a plurality of controls simulating the controls of a vehicle. Operation of these controls in accordance with a motion picture scene observed by the driver is automatically recorded to determine whether or not the driver responded properly or improperly to the stimuli. In the case of automobiles, the motion picture scene would depict travel along a road and a number of different situations would be presented in the course of the travel such as turning corners, stopping for a light, passing another vehicle, sudden appearance of an obstacle or person in the path of travel and so forth.

It is important in the instruction of drivers by this method to provide realistic stimuli and realistic control devices so that the driver can learn to respond in the manner required under actual driving conditions. Accordingly it is one object of the invention to provide means for presenting to a driver being tested a realistic feeling of backing without the need for providing additional apparatus in the form of auxiliary motion picture projectors, means for reversing the position of the simulated vehicles and the like. This invention avoids complicated and expensive additional apparatus and provides a realistic presentation of the stimuli since the training testing procedure need not be interrupted for instruction in reverse operation. For instance, in learning parking techniques, the motion picture can be prepared to run continuously so that the driver gets the actual feeling of pulling along side of a car and then immediately start backing into the parking space behind such car.

Another object of the invention is the provision of means including at least one mirror positioned relative to the simulated vehicle so that the driver upon turning his head to observe the mirror image of the motion picture screen will receive substantially the same impression as the driver of a modern car receives in viewing the road in back of him through the rear window.

Still another object of the invention is the provision of at least one reflecting surface fixed relative to the driver being tested and by means of which he will be presented with realistic impressions substantially identical to those experienced in actual driving. One method for the attainment of this end resides in the use of a reflecting surface behind the driver simulating the rear window of an auto and which can be directly or indirectly observed to provide him with very realistic illusion of operating an actual vehicle.

This invention in certain respects constitutes an improvement of the mechanism disclosed and claimed in Chedister Patent No. 2,341,312, dated February 8, 1944, and in other respects comprises an independent invention.

It will be understood that the foregoing general description and following detailed description are merely exemplary and explanatory of the invention and not restrictive thereof.

The perspective view of the automatic apparatus for training or testing drivers shown in Figure 1 includes a group of driver training or testing mechanisms 10 each having individual controls simulating the controls of an automobile. These training devices 10 are each positioned to view a motion picture screen 16 preferably at one end of a classroom and at the other end of the room, opposite the screen 16, is the projection apparatus 14 which includes a motion picture projector 11 and recorder 66. Each of the training devices 10 are electrically coupled through cables 200 to the recorder 66 so that a permanent record can be made of the actions of each student to the stimuli presented on the screen 16. The testing devices each include controls simulating the controls of the particular vehicle for which instruction is offered. In the present instance they simulate conventional automotive vehicles and have among other controls a steering wheel 70, clutch and brake pedals 80 and 90, accelerator pedal 100, ignition switch 110 and a speedometer 120. In addition to the motion picture projector 11 and recorder 66, the console 14 also includes a still projector 12, controls 34, 49 and 54 and a series of push buttons "a" through "j" for manually controlling the connections of each device 10 to the recorder 66. For a more detailed description of this apparatus reference is made to the above mentioned Chedister patent of which this invention constitutes an improvement.

One of the problems in training or testing drivers resides in the need for thorough instruction in backing-up techniques that are necessary for everyday driving and particularly parking. According to the invention each simulated vehicle 10 is provided with an individual mirror or other reflecting means positioned to the right and just behind the student. These reflecting surfaces and associated supporting means are denoted in the drawings by the numeral 22 and overcome the aforementioned difficulties. They are adjustably mounted and can be set so that each student by turning his head, in the manner one would to look out of the rear window of an auto, will observe the motion picture on the screen in front of the classroom. The actual picture shown during the backing tests would preferably have been photographed from the rear of a vehicle in the process of backing and when shown on the screen would be reversed to compensate for the reversal of the picture when the student views the mirror image.

One form of the mirror and supporting assembly 22 is shown in Figure 2 attached to the seat 24 of the testing device 10. The mirror or other reflecting means 26 is preferably carried by a protective frame 28 having a universal or ball joint 30 secured to the back side thereof. A telescoping support comprising a lower tubular member adjustably attached to the seat and an upper member 32 slidably supported by the tubular member 33 is connected with the universal connector 30. In this way the mirror 26 can be raised or lowered by loosening the clamping nut 36 and moved horizontally and vertically relative to the end of the supporting member 32.

The lower end of the tubular rod section 33 is secured at the base of the seat 24 by a mount 38 and cooperating screws 40. This mount includes a U-shaped bracket 42, the legs of which are adjustably pivoted to the central mount part 46 by means of the bolt 44. Extending upwardly from bracket 42 is a second U-shaped bracket 48 to which the tubular support 34 is attached by means of a bolt 50. With this structure rough positioning of the mirror 26 relative to the student can be accomplished by the adjustable features of the mount and fine adjustment by the universal joint 30.

Figure 3 of the drawings is illustrative of the function of the mirrors 26 in instructing students in backing-up procedures and shows three mechanisms 10 in different positions relative to the screen 16. For convenience the three positions are denoted as 10a, 10b and 10c and the mirrors 26 have been enlarged to more clearly illustrate their function. In the position 10a the reflector 26a while positioned at the right and to the rear of the student, is tilted slightly so that the student will see the entire screen while backing up. The ray lines illustrate the manner in which the screen image is reflected by the mirror so as to give the student the illusion of actually viewing the road behind him as he is backing up. Positions 10b and 10c are identical to position 10a but the mirror or reflectors 26b and 26c are tilted slightly more than the reflector 26a to accommodate for the placement of those positions relative to the screen.

It has been found in actual practice and with sufficient apparatus to accommodate a sizable group of students, that each student regardless of his position relative to the screen and the slightly different angular positions of the mirrors, receives a realistic illusion of viewing the road behind him. In this way a film portraying the movement of a car while parking may be shown continuously and with but a single projector and expensive duplicate projection equipment, means for rotating the mechanisms 10 and other complicated and expensive equipment can be completely eliminated.

The invention in its broader aspects is not limited to the specific mechanisms shown and described but departures may be made therefrom within the scope of the accompanying claims without departing from the principles of the invention and without sacrificing its chief advantages.

What is claimed is:

1. In a driver testing machine, the combination comprising means for presenting stimuli in the form of a scene to the subject being tested, and in front of said subject a subject operated control device and a mirror immediately to the rear of said subject and positioned so that the subject may turn from the scene to face the mirror so that the scene is viewed as reflected by the mirror and for observing said subject is presented with stimuli simulating reverse operation of said device.

2. In driver testing apparatus, a control device simulating a vehicle, a screen, means for projecting a picture on said screen, and a reflecting surface, the screen and reflecting surface being respectively in front and in back of the driver, whereby the driver being tested may turn rearwardly and observe the projected picture reflected by said surface to simulate reverse motion of said simulated vehicle.

3. In apparatus for testing drivers, the combination comprising a control device simulating an actual vehicle, a screen in front of said control device, means for projecting a scene on said screen to simulate forward or rearward motion of the vehicle and a reflecting mirror to the rear of said device whereby the driver may turn rearwardly and observe the reflected image of said scene to simulate observation of a scene behind the control device for reverse operation thereof.

References Cited in the file of this patent

UNITED STATES PATENTS

| | | |
|---|---|---|
| 2,088,264 | Heinis | July 27, 1937 |
| 2,301,126 | Kriebel | Nov. 3, 1942 |
| 2,341,312 | Chedister | Feb. 8, 1944 |
| 2,392,142 | Gosswiller | Jan. 1, 1946 |
| 2,665,608 | Clark | Jan. 12, 1954 |